215-11.
#3
67754 OR RE 098 SR
E. PRATT.
ARTIFICIAL NIPPLE.
No. Reissue 98 Reissued July 24, 1847
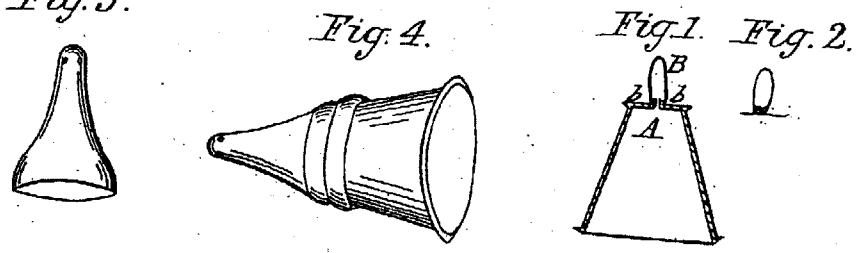
Inventor.
Elijah Pratt

UNITED STATES PATENT OFFICE.

ELIJAH PRATT, OF NEW YORK, N. Y.

IMPROVEMENT IN VALVES FOR ARTIFICIAL NIPPLES AND OTHER PURPOSES.

Specification forming part of Letters Patent No. 4,131, dated August 4, 1845; antedated July 4, 1845; Reissue No. 98, dated July 24, 1847.

*To all whom it may concern:*

Be it known that I, ELIJAH PRATT, of the city, county, and State of New York, have invented a new and useful Improvement in Valves for Artificial Nipples, which is also applicable to other purposes; and I do hereby declare that the following is a full, clear, and exact description thereof.

The same letters indicate like parts in all the figures.

The nature of my invention consists in making valves of india-rubber or other substance having like or nearly like elastic properties by simply making a slit through the solid india-rubber, &c., either by cutting through the solid substance or by uniting two or more pieces and having a part of the surfaces united to form the slit, the part of the slit nearest the fluid which is to pass through the valve being kept separated either by distending or giving the required form to the substance of which the valve is formed, so that the fluid to be forced through may force open the lips of the valve.

Figure 1 is a section of the improved artificial nipple. In figure and dimensions it resembles other devices of the kind, being made conical with the wide end open, the edge being shaped so as to press upon without injuring the breast. The small end is closed with the exception of a minute perforation in the center. (Shown at A, Fig. 1.) The material around the perforation projects, as shown at *b b*, Fig. 1, so as to form a tube about one-eighth of an inch in length, over which is attached, by ligatures or silver wire, a tube of india-rubber (see B, Figs. 1 and 2) about half an inch in length. This last tube is constructed of a flat piece of india-rubber cut square at one end and conical at the other. It is then perforated through its thickness in the direction of its length, so as to leave a slit on its upper end, and the lower end having an opening large enough to fit upon the projecting part of the nipple *b b*, Fig. 1. It can also be constructed by cutting a piece of india-rubber of suitable dimensions through its thickness lengthwise. The sides are then cemented together and pressed. The form is the same as the last described. The tube is designed to perform the purpose of a valve by allowing the lips of it to close at the end of every inspiration.

Fig. 2 represents the tube with the lips partly open. Fig. 3 is an india-rubber sheath designed to slip over the smaller end of Fig. 1, as represented at Figs. 3 and 4. The contractile sheet is to be drawn sufficiently over the projecting edge of Fig. 1 as to form an air-tight joint without ligature.

The advantage of this nipple is that it remains attached to the breast when the child temporarily ceases to draw, the lips of the valve closing at the end of every inspiration, thereby preventing the entrance of air destroying the partial vacuum within. When the instrument is to be removed, the sheath is slipped off and the lips opened by pressing the edges with the fingers or by pressing the breast so as to admit the outward air into the vacuum.

It will be obvious from the foregoing that my improved valve is applicable as a substitute for all other kinds of valves except where the fluids to be passed through are of a nature or under conditions which will act injuriously on the substance or substances of which the valve or valves are made—such, for instance, as steam of a high temperature, or fluids which would not act chemically or otherwise to decompose or destroy the elasticity of the valve.

From what has been described it follows that the true nature of the valve invented by me consists simply in substituting artificial elastic lips for all kinds of valves heretofore employed in machinery, the elasticity of the lips closing the aperture and only yielding to the passage of the fluid under a force greater than the elastic force of the substance constituting the lips of the valve.

The variations which may be made in the mode of attaching such valves are too numerous to be enumerated, and will be obvious to all persons skilled in the various branches of the arts in which apparatus to act on or to be acted on by fluids are made or used, and therefore I have merely described that mode which I deem the most simple and effective, and it will be obvious that the form of such valves may be variously changed so long as the principle pointed out above is retained—viz., forming the valve by means of elastic lips.

What I claim as my invention, and desire to secure by Letters Patent, is—

Forming the valves for the passage of fluids by means of elastic lips, substantially in the manner and for the purposes described.

ELIJAH PRATT.

Witnesses:

J. M. THAYER,

ALEX. PORTER BROWNE.